United States Patent
Payne

(10) Patent No.: US 7,280,250 B2
(45) Date of Patent: Oct. 9, 2007

(54) METHOD AND APPARATUS FOR RENDERING LARGE PATTERNS IN A SMALL MEMORY PRINTER

(75) Inventor: Ralph E. Payne, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1018 days.

(21) Appl. No.: 10/259,574

(22) Filed: Sep. 27, 2002

(65) Prior Publication Data

US 2004/0061898 A1    Apr. 1, 2004

(51) Int. Cl.
  *G06F 15/00*  (2006.01)
  *G06F 9/36*   (2006.01)
  *H04N 1/387*  (2006.01)

(52) U.S. Cl. .................. 358/1.9; 358/1.16; 358/1.17; 358/453; 382/286; 382/287

(58) Field of Classification Search ............... 358/1.9, 358/2.99, 2.1, 1.18, 1.16, 1.17; 715/911; 382/286, 287

See application file for complete search history.

(56) References Cited

U.S. PATENT DOCUMENTS

| | | | | |
|---|---|---|---|---|
| 5,966,136 A | * | 10/1999 | Kurtz et al. | 345/620 |
| 6,323,958 B1 | * | 11/2001 | Shimizu | 358/1.9 |
| 6,654,135 B2 | * | 11/2003 | Mitani | 358/1.15 |
| 6,665,081 B1 | * | 12/2003 | Suzuki et al. | 358/1.13 |
| 6,734,987 B1 | * | 5/2004 | Cauligi | 358/1.16 |
| 7,110,007 B2 | * | 9/2006 | Odagawa | 345/634 |
| 7,133,158 B2 | * | 11/2006 | Ghose et al. | 358/1.9 |

* cited by examiner

*Primary Examiner*—Douglas Q. Tran
*Assistant Examiner*—Chan S. Park
(74) *Attorney, Agent, or Firm*—Robert D. Marshall, Jr.; W. James Brady, III; Frederick J. Telecky, Jr.

(57) ABSTRACT

A method of performing a pattern fill operation of a pattern into a clipping region divides dividing the pattern into a plurality of bands. For each band the method renders the band as a bit map into a band cache. For each tiling of the pattern into the clipping region the method clips the bit map of a current band to the clipping region and copies the clipped bit map into a corresponding location of a page bit map. The plurality of bands of the pattern are preferable aligned with scan lines of the printed page. The bands may correspond to individual scan lines. The method select the number of bands so that each band may be stored within a predetermined amount of band cache memory.

15 Claims, 4 Drawing Sheets

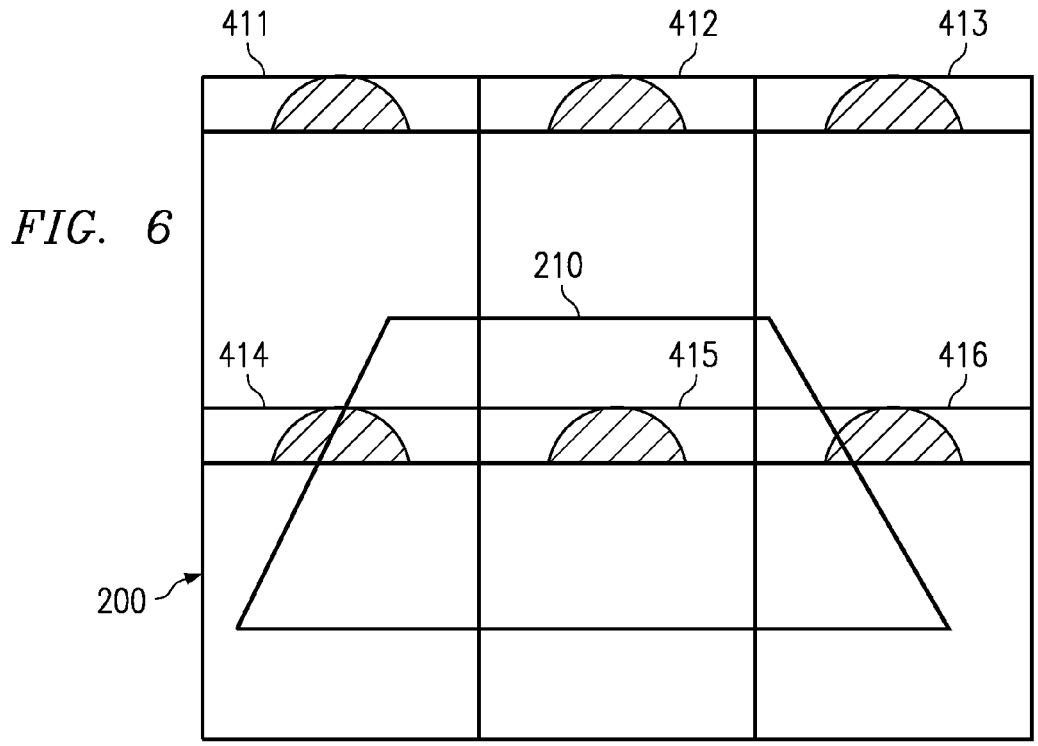
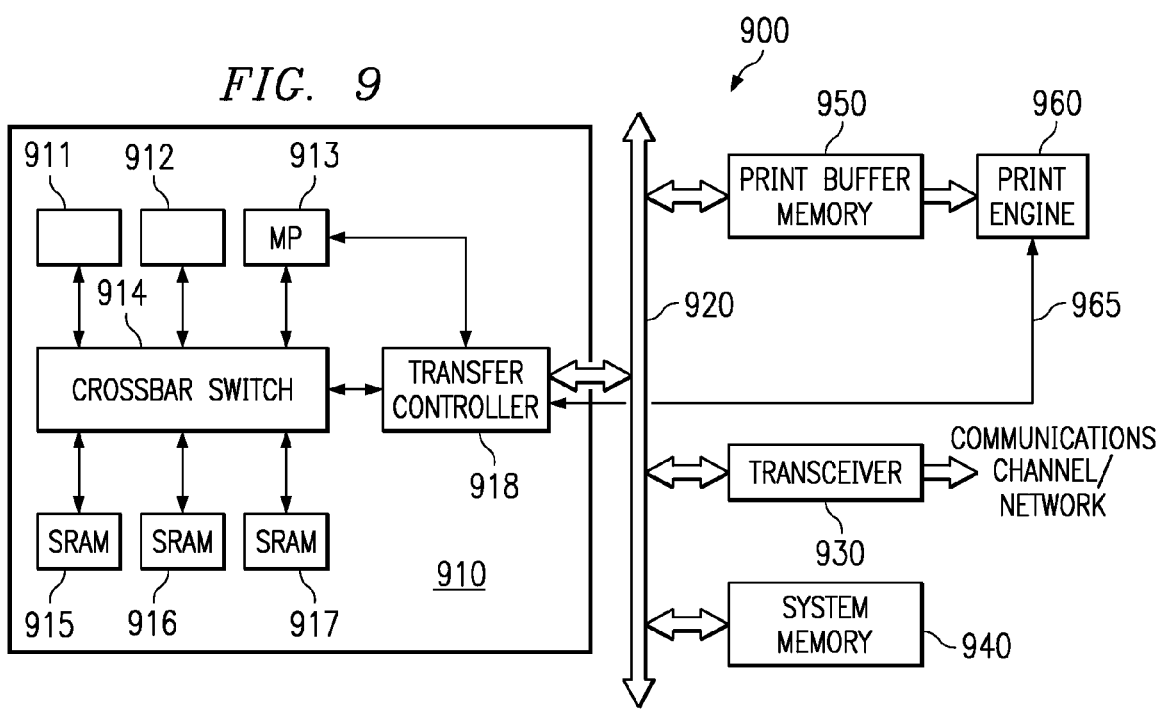

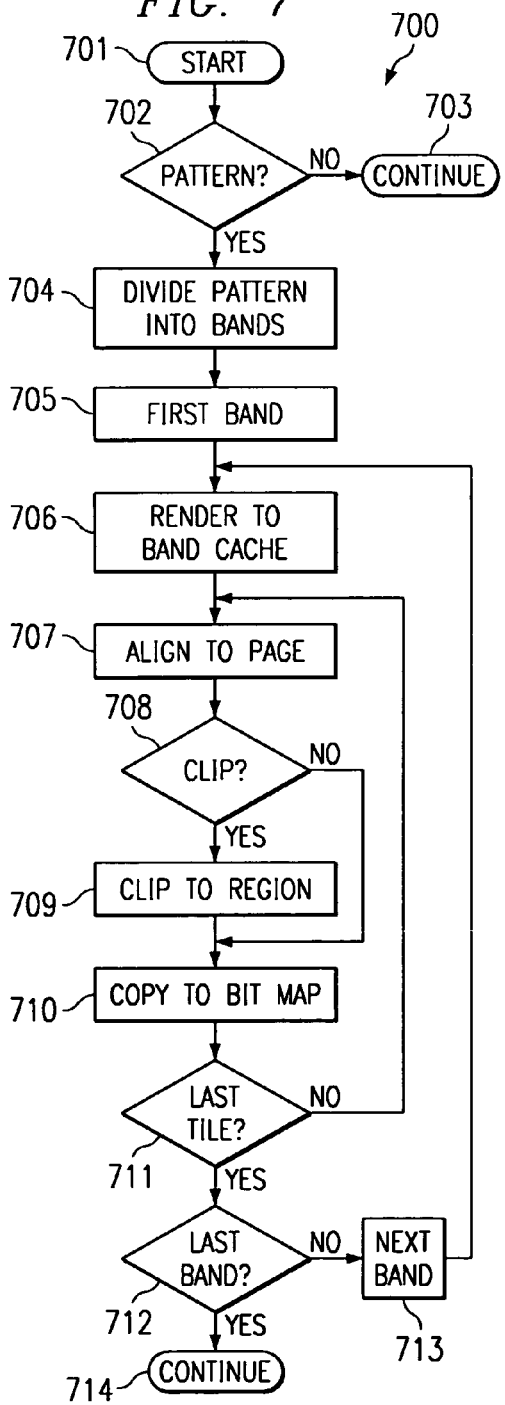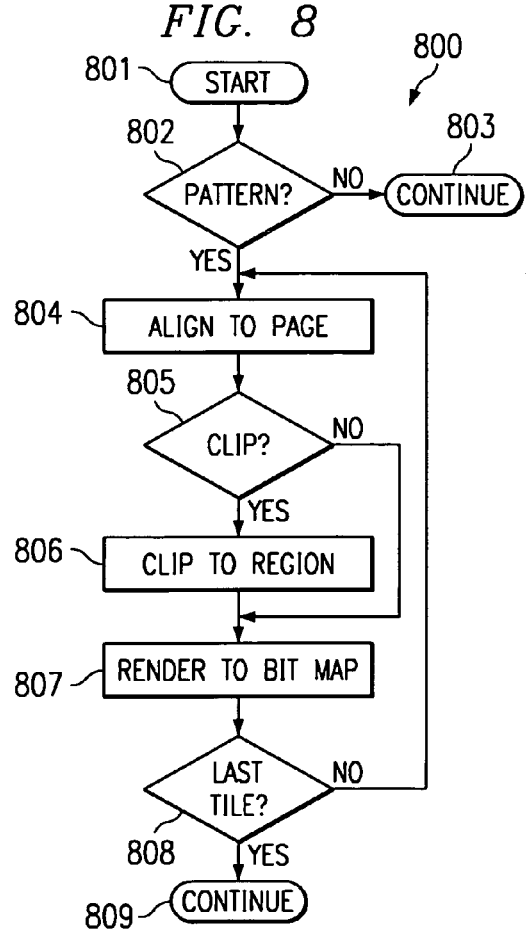

METHOD AND APPARATUS FOR RENDERING LARGE PATTERNS IN A SMALL MEMORY PRINTER

TECHNICAL FIELD OF THE INVENTION

The technical field of this invention is printer control and more particularly printer control rendering large patterns with minimal memory.

BACKGROUND OF THE INVENTION

A pattern fill operation employs a pattern in a repeating structure to fill a graphics object such as a polygon. In a page description languages like PostScript, patterns are typically reduced to images at the device resolution and stored in a pattern cache for later use to render objects in device space. However, storing the image for a large pattern in the pattern cache at high resolutions takes huge amounts of memory. This requirement of large amounts of memory is disadvantageous.

PostScript printers have traditionally either aborted a printed page upon exceeding the pattern cache capacity or have reverted to some method that was either slow, poor in quality or both. The interaction between the interpreter and the rendering made it difficult to band the display list and execute in a page pipeline mode where different pages are, simultaneously, in different stages of the conversion from page description language to page bit map. The PostScript Red Book, a reference for use of PostScript, explicitly limits the PostScript Language primitives that can be used to describe a large pattern. This limitation is an attempt to avoid the problems of caching large pattern primitives.

SUMMARY OF THE INVENTION

In this invention the Postscript interpreter turns the page description into a display list subroutine. The elements in this subroutine are the same as those that are used in a rasterizing subsystem rendering to the page output frame buffer. The rasterizing subsystem renders the large pattern into a work space one piece at a time. An extension to the rasterizing subsystem segments the large pattern into smaller patterns each of which is then rendered to the page buffer transparently to the existing rasterizing primitives. This extension bands the op-codes that describe the large pattern and creates a unique representation of the display list subroutine for each pattern segment. This banding is performed on scan line boundaries to simplify the banding.

This approach guarantees that the pattern will print with the maximum system quality allowed by the printer. This occurs even with a small printer memory. Thus the printer does not abort the page with an out of memory message. This invention decouples the interpreter from the display list.

This method allows the printer to print more complex pages. This increases user satisfaction with the printer. Some pages that overflow the pattern cache in a prior art implementation and cause quality reducing reversion compress/decompress cycles will actually be rendered at full quality using this method. Employing the same set of rasterizing primitives for this pattern cache reduction and for rendering shortens the software development for the printer. Page pipelining is enhanced by decoupling the page description language interpretation from the rasterizing.

BRIEF DESCRIPTION OF THE DRAWINGS

These and other aspects of this invention are illustrated in the drawings, in which:

FIG. 6 illustrates tiling the example band of FIG. 6 into the clip region;

FIG. 7 illustrates in flow chart form the manner of tiling a pattern into a region within a printed page according to this invention;

FIG. 8 illustrates in flow chart form an alternate manner of tiling a pattern into a region within a printer page; and FIG. 9 illustrates an example printer system such as would employ this invention.

DETAILED DESCRIPTION OF PREFERRED EMBODIMENTS

Many page description languages, such as PostScript, manage repeating patterns in the printed image. Typically the page description language defines the pattern, the region to be filled by the pattern and initial alignment. The page rendering process then fills a print page buffer with the pattern. The pattern is repeated and clipped to the region as required. It is typical to employ a pattern cache to store the pattern during this process. The whole pattern is rendered into the pattern cache as a bit map in the resolution of the printer. This pattern bit map is used as the source in the pattern fill operation. Copying the bit map from the pattern cache to a page bit map is faster than rendering from another source. Additionally, using a pattern cache means that the pattern need only be rendered once while it can be used multiple times. These factors tend to reduce the printer memory and computational requirements. This could create a problem for large patterns.

The speed of rendering patterns into the proper page locations affects the speed the printer prepares the page for printing. In some printers, such as ink jet printers, printing can pause between print lines for the data processing to catch up to the printing. In other printers, such as laser printers, the print process has a constant speed though the whole page. The page cannot be printed unless the data is ready at the precise time needed. Printing complex pages on printers of the second type often results in long pauses between pages for the next page to be composed.

Figure 1:
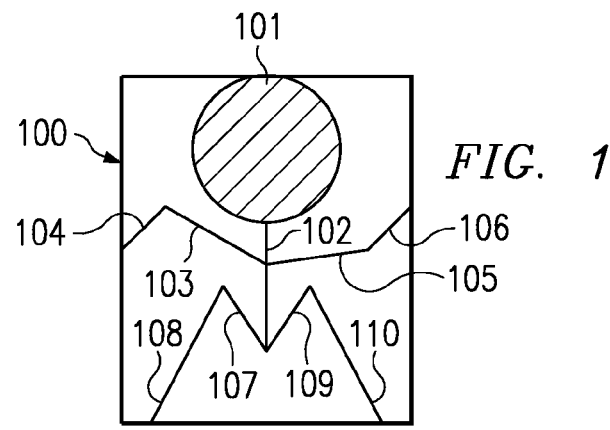
FIG. 1 illustrates an example pattern.
Figure 2:
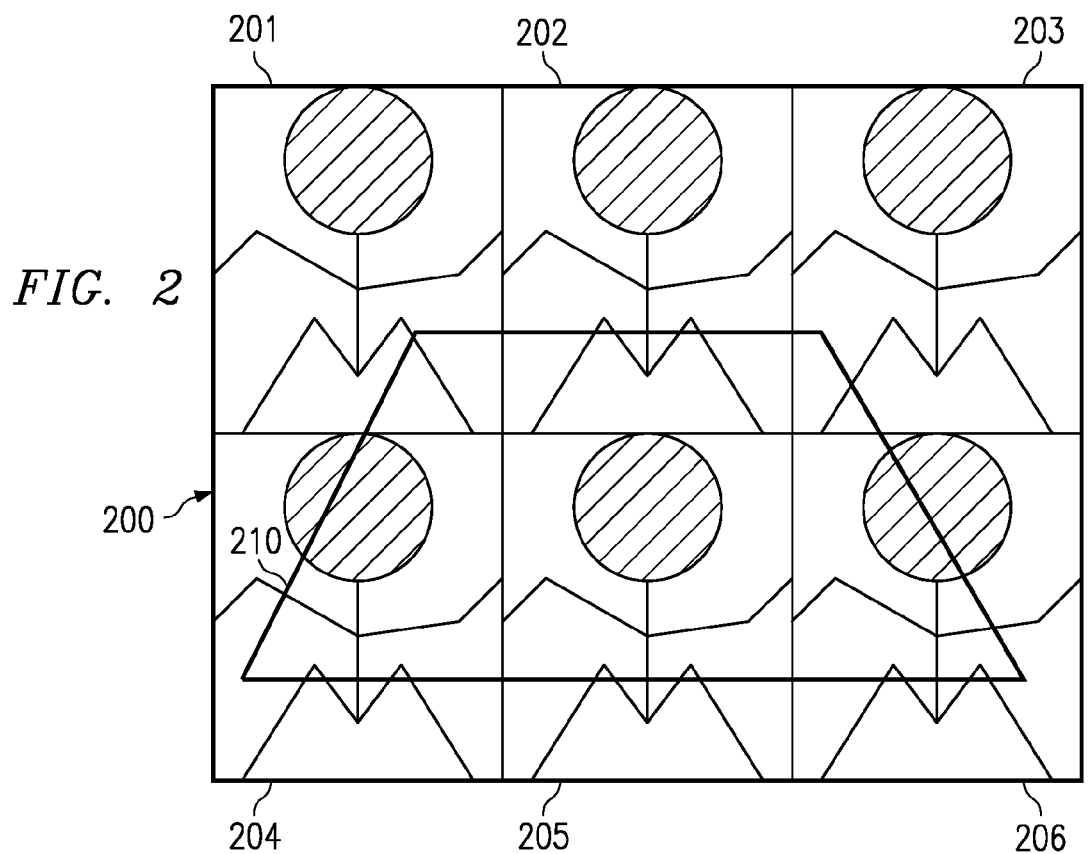
FIG. 2 illustrates an example of tiling the pattern of FIG. 1 into a clip region.
Figure 3:
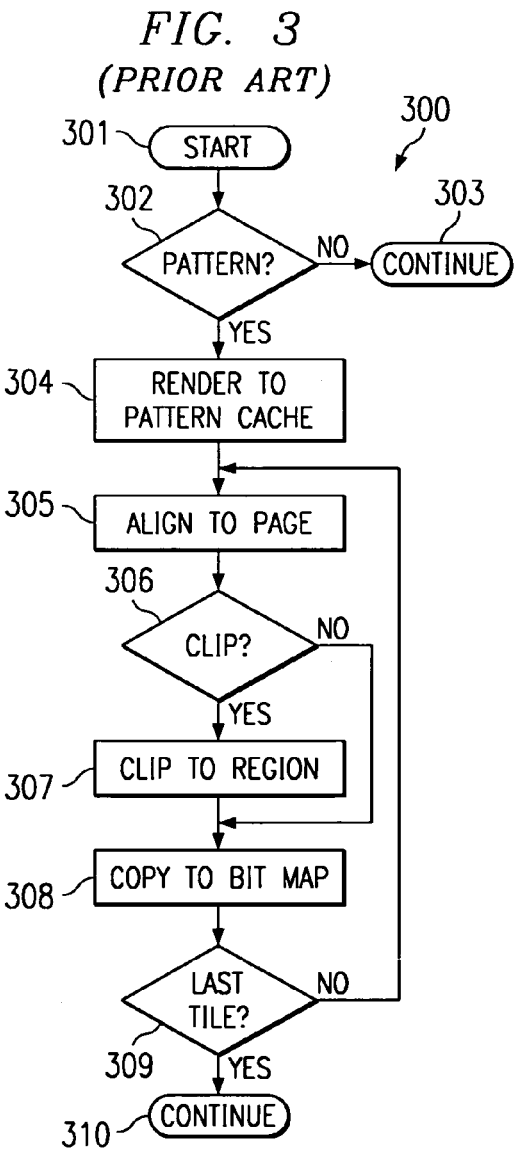
FIG. 3 illustrates in flow chart form the prior art manner of tiling a pattern into a region within a printed page.

This process is illustrated in FIGS. 1, 2 and 3. FIG. 1 illustrates pattern 100. Pattern 100 is specified in any manner permitted by the page description language. In the example of FIG. 1, pattern 100 is a display list consisting of filled circle 101 and lines 102, 103, 104, 105, 106, 107, 108, 109 and 110. As known in the art, each display list element includes parameters, such as location and color, to describe the element. Note that FIG. 1 merely illustrates an example pattern. Many such patterns are possible and there are other known many ways to specify the contents of the pattern.

FIG. 2 illustrates page 200 including a tiling of pattern 100 into trapezoid 210. FIG. 2 illustrates six tilings of pattern 100, namely 201, 202, 203, 204, 205 and 206. On rendering page 200 these tiling of pattern 100 will be clipped to trapezoid 210. Thus only those portions of tilings 201, 202, 203, 204, 205 and 206 enclosed within trapezoid 210 will be visible on page 200 when printed. This pattern fill operation must specify the alignment of the tilings 201, 202, 203, 204, 205 and 206 to trapezoid 210 in the coordinates of page 200. Though not illustrated in FIG. 2, those skilled in that art would realize that the relative sizes of pattern 100 and trapezoid 210 may permit one or more tilings of pattern 100 to fit wholly within trapezoid 210 without clipping.

FIG. 3 illustrates the rendering process of a pattern fill according to the prior art. Subroutine 300 is a part of the program that renders a page specified in a page description language into a page bit map that can be printed. Subroutine 300 begins with start block 301. Subroutine 300 first tests to determine if the page data requests a pattern fill (decision block 302). If not (No at decision block 302), then subroutine 300 is inapplicable. Page processing continues at block 303. If so (Yes at decision block 302), the subroutine 300 is applicable. Subroutine 300 renders the pattern into a pattern cache (processing block 304). This rendering involves converting the page description display list of pattern 100 into a page bit map of appropriate dimensions for the page bit map. This page bit map is stored in a portion of memory designated a pattern cache for ease of access.

Subroutine 300 next aligns that particular tiling of pattern 100 to the page (processing block 305). FIG. 2 illustrates tilings 201, 202, 203, 204, 205 and 206. Each of these tilings is set at a different location on page 200. Processing block 305 computes the proper alignment of that particular tiling to the coordinates of page 200.

Subroutine 300 next tests to determine if that tiling needs to be clipped (decision block 306). FIG. 2 illustrates tilings 201, 202, 203, 204, 205 and 206, all of which need to be clipped to fill trapezoid 210. As mentioned above, it is possible that a particular tiling of pattern 100 will completely fit within trapezoid 210. In that instance (No at decision block 306), the whole pattern is copied into the page bit map (processing block 308). In this instance the bit map data of pattern 100 stored within the pattern cache is copied to the corresponding locations within the page bit map. If the particular tiling of pattern 100 needs to be clipped to trapezoid 210 (Yes a decision block 306), then this tiling is clipped to trapezoid 210 (processing block 307). The unclipped portion of the tiling of pattern 100 is then copied to the page bit map (processing block 308). Those portions of the bit map of pattern 100 not clipped are copied into the corresponding locations of the page bit map.

Subroutine 300 then tests to determine if the present tiling of pattern 100 is the last (decision block 309). As illustrated in FIG. 2, pattern 100 fill to trapezoid 210 includes tilings 201, 202, 203, 204, 205 and 206. In the example of FIG. 2, for tilings 201, 202, 203, 204 and 205, there is another tiling (No at decision block 309). If this is the case, then subroutine 300 returns to processing block 305 and realigns pattern 100 to the new tiling. The process of blocks 305, 306, 307, 308 and 309 repeat for this new tiling. If this is the last tiling (Yes at decision block 309) such as tile 206 illustrated in FIG. 2, then subroutine 300 is complete. Processing continues for other portions of the page rendering at continue block 310.

This prior art technique has many advantages. The pattern is rendered to a bit map in the device coordinates only once. This avoids rendering the pattern for each tiling in the pattern file operation. Most of the fill operation is performed via simple and fast memory transfer operations from the pattern cache to the page bit map. The rendering of the pattern to the pattern cache typically employs the same techniques for rendering other page display list elements to the page bit map. Thus much computer code used in the rendering operation can be reused in the pattern fill operation.

There are problems with this prior art technique. Many problems arise when the pattern is large and thus requires a large amount of memory to store the pattern cache. Some printers are configured with a maximum allowable pattern cache. If the rendered pattern exceeds this size, this prior art technique cannot be used. The printer may not be able print such a page. In this case it would typically return an error message to the controlling computer. Large patterns will also cause problems in printers that have no fixed pattern cache allocation. A large pattern would crowd out other uses of memory. A large pattern may prevent the printer from being able to store the entire page bit map. The printer would be required to employ techniques to reduce memory usage in the rendering process. Some techniques, such as banding the page, require a minimum amount of processing capacity to be able to render a next band before a prior band has completed printing. Other techniques involve data compression of the rendered page bit map generally reducing the complexity and available detail of printed page.

Figure 4:
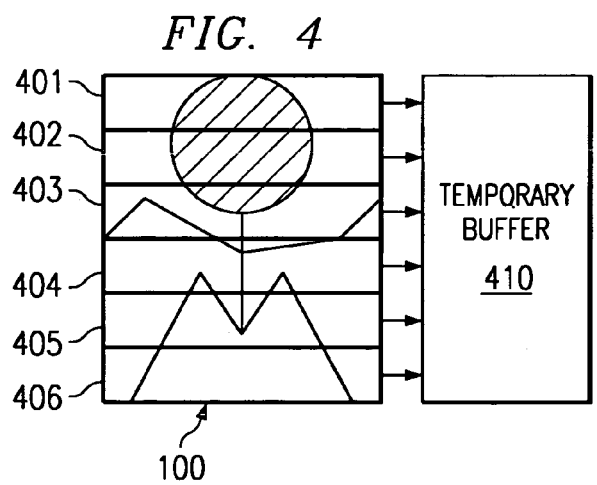
FIG. 4 illustrates banding of the example pattern of FIG. 1.
Figure 5:
FIG. 5 illustrates an example band from the banding of FIG. 4.

FIGS. 4, 5, 6 and 7 illustrate this invention. FIG. 4 illustrated pattern 100 divide into plural horizontal bands 401, 402, 403, 404, 405 and 406. Each of horizontal bands 401, 402, 403, 404, 405 and 406 are small enough to fit within temporary buffer 410. FIG. 5 illustrates band 401, corresponding to the top of the head of the figure, in isolation.

FIG. 6 illustrates page 200 including a tiling of band 401 of pattern 100 into trapezoid 210. FIG. 6 illustrates six tilings of band 401, namely 411, 412, 413, 414, 415 and 416. On rendering page 200 these tilings of band 401 will be clipped to trapezoid 210. Thus only those portions of tilings 411, 412, 413, 414, 415 and 416 enclosed within trapezoid 210 will be visible on page 200 when printed. This pattern fill operation must specify the alignment of the tilings 411, 412, 413, 414, 415 and 416 to trapezoid 210 in the coordinates of page 200 in the same manner as illustrated in FIG. 2. Note that tiling 415 fits wholly within trapezoid 210 without clipping. Those skilled in the art would realize that other cases where a tiling of the band does not need to be clipped to trapezoid 210 are possible.

FIG. 7 illustrates the rendering process of a pattern fill according to this invention. Subroutine 700 is a part of the program that renders a page specified in a page description language into a page bit map that can be printed. Subroutine 700 serves as a substitute for subroutine 300 illustrated in FIG. 3. Subroutine 700 begins with start block 701. Subroutine 700 first tests to determine if the page data requests a pattern fill (decision block 702). If not (No at decision block 702), then subroutine 700 is inapplicable. Page processing continues at block 703. If so (Yes at decision block 702), the subroutine 700 is applicable. Subroutine 700 then divides pattern 100 into horizontal bands (processing block 704). In the preferred embodiment these horizontal bands align with the horizontal scan lines of the printed page. This makes the pattern fill operation track to printer scan lines. It is preferable to select the number of bands with regard to the available memory for storing the band. That is, the number of bands selected should be high enough so that each band will fit within the memory allocated to the pattern cache. Subroutine 700 then considers the first band (processing block 705).

Subroutine 700 renders the band of the pattern into a band cache (processing block 706). Note that this pattern cache can be temporary buffer 410 illustrated in FIG. 4. This rendering involves converting the page description display list of pattern 100 into a bit map of appropriate dimensions for the page bit map. This rendering requires clipping the pattern to the current band. Since the band have been selected to align to the horizontal scan lines of the printer, this clipping operation will be simple. This bit map of the band is stored in a portion of memory designated a pattern cache for ease of access.

Subroutine 700 next aligns that particular tiling of current band of pattern 100 to the page (processing block 707). FIG. 6 illustrates band tilings 411, 412, 413, 414, 415 and 416. Each of these band tilings is set at a different location on page 200. Processing block 707 computes the proper alignment of that particular band tiling to the coordinates of page 200.

Subroutine 700 next tests to determine if that band tiling needs to be clipped (decision block 708). FIG. 6 illustrates tilings 411, 412, 413, 414 and 416 which need to be clipped to fill trapezoid 210 and band tiling 415 which does not. It is possible that a particular band tiling, such as band tiling 415, 100 will completely fit within trapezoid 210. In that instance (No at decision block 708), the whole band is copied into the page bit map (processing block 710). In this instance the bit map data of current band of pattern 100 stored within the pattern cache is transferred to the corresponding locations within the page bit map. If the particular band tiling of pattern 100 needs to be clipped to trapezoid 210 (Yes a decision block 708), then this tiling is clipped to trapezoid 210 (processing block 709). The unclipped portion of the band tiling of pattern 100 is then copied to the page bit map (processing block 710). Those portions of the bit map the current band of pattern 100 not clipped are copied into the corresponding locations of the page bit map.

Subroutine 700 then tests to determine if the present band tiling is the last (decision block 711). As illustrated in FIG. 7, pattern 100 fill to trapezoid 210 includes band tilings 411, 412, 413, 414, 415 and 416. In the example of FIG. 7, for band tilings 411, 412, 413, 414 and 415, there is another tiling (No at decision block 711). If this is the case, then subroutine 700 returns to processing block 707 and realigns the current band of pattern 100 to the new band tiling. The process of blocks 707, 708, 709, 710 and 711 repeat for this new band tiling.

If this is not the last band tiling (No at decision block 711), such as band tilings 411, 412, 413, 414 and 415 illustrated in FIG. 7, then subroutine 700 returns to processing block 707. The current band is aligned to the next tiling (processing block 707) and then copied to the page bit map (decision block 708 and processing blocks 709 and 710). These steps are described above.

If this was the last band tiling (Yes at decision block 711), then subroutine 700 tests to determine if the current band is the last band (decision block 712). If the current band is not the last band (No at decision block 712), then subroutine 700 advances to the next band (processing block 713). This new band is rendered to the band cache (processing 706) as the prior band. The loop including processing block 707, decision block 708, processing blocks 709 and 710 and decision block 711 repeat until the last tiling of this band completes (Yes at decision block 711). The test for the last band then repeats (decision block 712). If the current band is the last band (Yes at decision block 712), then subroutine 700 continues for other portions of the page rendering at continue block 714.

The technique of this invention permits rendering the large pattern in full resolution without requiring a large pattern cache. The pattern cache need only be large enough to accommodate one scan line. There is a small amount of additional overhead in dividing the pattern into bands and clipping the rendered pattern to the particular band. This latter clipping can be easily performed if the bands are selected to coincide with printer scan lines. There is a small amount of additional overhead in handling rendering to bands rather than rendering the whole pattern. However, no additional rendering is required by this invention and the total amount of computation for clipping the bands to the region is same as that computation as clipping pattern to the region.

FIG. 8 illustrates an alternative manner of performing a pattern fill operation. Subroutine 800 begins with start block 801. Subroutine 800 first tests to determine if the page data requests a pattern fill (decision block 802). If not (No at decision block 802), then subroutine 800 is inapplicable. Page processing continues at block 803. If so (Yes at decision block 802), the subroutine 800 is applicable. Subroutine 800 aligns that particular tiling of pattern 100 to the page (processing block 804). Processing block 804 computes the proper alignment of that particular tiling to the coordinates of page 200. Several alternative techniques are described below.

Subroutine 800 next tests to determine if that tiling needs to be clipped (decision block 805). It this particular tiling of pattern 100 will completely fit within trapezoid 210 (No at decision block 805), the whole pattern is rendered into the page bit map (processing block 807). Because pattern 100 is typically described in a display list using the same elements as used generally, this rendering is the same. If the particular tiling of pattern 100 needs to be clipped to trapezoid 210 (Yes a decision block 805), then this tiling is clipped to trapezoid 210 (processing block 806). The unclipped portion of the tiling of pattern 100 is then rendered to the page bit map (processing block 807).

Subroutine 800 then tests to determine if the present tiling of pattern 100 is the last (decision block 808). If this is the case, then subroutine 800 returns to processing block 804 and realigns pattern 100 to the new tiling. The process of blocks 804, 805, 806, 807 and 808 repeat for this new tiling. If this is the last tiling (Yes at decision block 808), then subroutine 800 is complete. Processing continues for other portions of the page rendering at continue block 809.

There are three alternatives for aligning the pattern to the page (processing block 804). The pattern is generally defined by a display list in its own set of coordinates. The uncached pattern is represented by a list of operation codes (opcodes). These are rendered into primitives, such as trapezoid fill or run length. Such primitives include parameters such as: a pointer to the clipped region; a pointer to the pattern destination in device space; and an offset from the pattern destination. The pattern can be painted into the region by a display list construct such as:

Set Region(parameters)
Set Pattern Destination(parameters)
Call Pattern Star
Set Pattern Destination(parameters)
Call Pattern Star . . .

In this example Pattern Star is a display list of primitives representing the pattern such as:

Trapezoid Fill(parameters)
Trapezoid Fill(parameters) . . .
Runarray(parameters) . . .
ReturnCache It is necessary to translate these pattern coordinates to page coordinates for the later rendering operation (processing block 807). In a first embodiment, the data processor operating the printer creates a display list element for each tiling of the pattern. This is the easiest to do with a memory extension of the display list interpreter. Upon each instance of processing block 804, subroutine 800 selects the next instance of the pattern display list.

In a second embodiment, operation of a display list interpreter performing the rendering operation is augmented to include elementary control functions. These new elementary control functions increment the pattern step and call the pattern within loops or nested loops. This second embodiment requires less external memory than the first embodiment because multiple copies of the pattern display list are not required. However, this second embodiment would increase the complexity of the display list interpreter. This will typically result in an increase in instruction cache misses. The following pseudo code loop illustrates incrementing the pattern step:

Increment ystep
Initialize xstep
Increment xstep
Call Pattern
Test xstep
Repeat Block Test
Test ystep
Repeat Block Test A third embodiment defines a new opcode that consumes the pattern display list. This new opcode has the following format:

Pattern to region opcode
Number of parameters
Pointer to region
Pointer to pattern subroutine When the display list interpreter encounters the pattern fill display list element, it surrenders control to a surrogate that computes the parameters for each display list element in the pattern subroutine based on the pattern step and clipping region. The surrogate would then "call" the particular opcode in sequences with the parameters passed in the same manner as a normal display list interpreter. The interpreter that builds the display list can make the parameters relative to the pattern step values and the same opcodes can be used for both normal rendering and pattern subroutines.

FIG. 9 is a block diagram of a network printer system 900 including a multiprocessor integrated circuit 910 constructed for image and graphics processing according to this invention. Multiprocessor integrated circuit 910 provides the data processing including data manipulation and computation for image operations of the network printer system 900. Multiprocessor integrated circuit 910 is bi-directionally coupled to a system bus 920.

Network printer system 900 includes transceiver 930. Transceiver 930 provides translation and bidirectional communication between system bus 920 and a communications channel. One example of a system employing transceiver 930 is a local area network. Network printer system 900 responds to print requests received via the communications channel of the local area network. Multiprocessor integrated circuit 910 provides translation of print jobs specified in a page description language, such as PostScript, into data and control signals for printing.

Network printer system 900 includes a system memory 940 coupled to system bus 920. System memory 940 may include video random access memory, dynamic random access memory, static random access memory, nonvolatile memory such as EPROM, FLASH or read only memory or a combination of these memory types. Multiprocessor integrated circuit 910 may be controlled either in wholly or partially by a program stored in system memory 940. System memory 940 may also store various types of graphic image data.

Multiprocessor integrated circuit 910 communicates with print buffer memory 950 for specification of a printable image via a pixel or bit map. Multiprocessor integrated circuit 910 controls the image data stored in print buffer memory 950 via system bus 920. Data corresponding to this image is recalled from print buffer memory 950 and supplied to print engine 960. Print engine 960 provides the mechanism that places color dots on the printed page. Print engine 960 is further responsive to control signals from multiprocessor integrated circuit 910 for paper and print head control. Multiprocessor integrated circuit 910 determines and controls where print information is stored in print buffer memory 950. Subsequently, during readout from print buffer memory 950, multiprocessor integrated circuit 910 determines the readout sequence from print buffer memory 950, the addresses to be accessed, and control information needed to produce the desired printed image by print engine 960.

Multiprocessor integrated circuit 910 may be embodied by a TMS320C82 digital signal processor (DSP). FIG. 9 illustrates the basic architecture of this digital signal processor.

Multiprocessor integrated circuit 910 is a single integrated circuit. This integrated circuit is a fully programmable parallel processing platform that integrates two digital signal processor cores 911 and 912, a reduced instruction set computer (RISC) master processor (MP) 913, multiple static random access memory (SRAM) blocks 915, 916 and 917, a crossbar switch 914 that interconnects all the internal processors and memories, and a transfer controller (TC) 918 that controls external communications. Transfer controller 918 is coupled to system bus 920. Note that transfer controller 918 controls all data transfer between multiprocessor integrated circuit 910 and other structures coupled to system bus 920. Image data may be stored in system memory 940.

In operation, the individual digital signal processors 911 and 912 operate independently to transform page description data received via transceiver 930 into a corresponding page bit map data. This transformation includes the pattern fill operation described above. This page bit map data is stored in print buffer memory 950 for supply to print engine 960. Each digital signal processor 911 and 912 signals transfer controller 918 to transfer data from system memory 940 to the corresponding SRAM 915 and 916. During the pattern fill operation described in this invention, digital signal processors 911 and 912 may use portions of the corresponding SRAM 915 and 916 for the pattern cache. Alternatively, digital signal processors 911 and 912 may each use a designated portion of system memory 940 for the pattern cache. Digital signal processors 911 and 912 perform a programmed image transformation function on data in place in the corresponding SRAMs 915 and 916. The program for control of this image transformation is preferably stored in a non-volatile portion of system memory 940. Access by digital signal processors 911 and 912 and master processor 913 to SRAMs 915, 916 and 917 is mediated by crossbar switch 914. When complete, digital signal processors 911 and 912 signal transfer controller 918 to transfer data to print buffer memory 950. Transfer controller 918 preferably also includes a control channel 965 to print engine 960. Control channel 965 enables control of print functions by multiprocessor integrated circuit 910. Master processor 913 is preferably programmed for high level functions such as communication control functions not relevant to this invention.

What is claimed is:

1. A method of performing a pattern fill operation of a plurality of tilings of a pattern into a clipping region of a page to be printed comprising the steps of:
 dividing the pattern into a plurality of bands;
 for each band:
  rendering the current band of the pattern as a bit map into a band cache; and
  for each tiling of the pattern into the clipping region aligning a current tiling of the current band of the pattern to the page, clipping the bit map of the aligned current tiling of the current band of the pattern stored in the band cache to the clipping region, and copying the clipped bit map into a corresponding location of a page bit map;

until all tilings of all bands of the pattern are rendered to the page bit map.

2. The method of performing a pattern fill operation of claim 1, further comprising:

printing a page corresponding to the page bit map; and wherein said step of dividing the pattern into the plurality of bands divides the pattern into bands aligned with scan lines of the printed page.

3. The method of performing a pattern fill operation of claim 1, further comprising:

printing a page corresponding to the page bit map; and wherein said step of dividing the pattern into the plurality of bands divides the pattern into bands corresponding to individual scan lines of the printed page.

4. The method of performing a pattern fill operation of claim 1, wherein:

said step of dividing the pattern into the plurality of bands divides the pattern into a number of bands whereby each band may be stored within a predetermined amount of band cache memory.

5. A method of performing a pattern fill operation of a plurality of tilings of a pattern into a clipping region of a page to be printed comprising the steps of:

for each tiling of the pattern to the clipping region aligning the pattern to a current tiling of the pattern to the clipping region by generating a display list corresponding to the current tiling of the pattern to the clipping region and storing the display list of the current tiling of the pattern;

clipping the stored display list of the current tiling of the pattern to the clipping region; and rendering the clipped stored display list of current tiling of the pattern as bit map into a page bit map.

6. The method of performing a pattern fill operation of claim 5, further comprising:

printing a page corresponding to the page bit map.

7. The method of performing a pattern fill operation of claim 5, wherein:

said step of aligning the pattern data to the current tiling of the pattern to the clipping region includes iteratively stepping location parameters of the pattern data for each tiling.

8. The method of performing a pattern fill operation of claim 5, wherein:

said step of aligning the pattern data to the current tiling of the pattern to the clipping region includes for each tiling calling a subroutine which adjusts location parameters of the pattern data.

9. A printer comprising:

a transceiver adapted for bidirectional communication with a communications channel;

a memory;

a print engine adapted for placing color dots on a printed page according to received page bit map data and control signals; and a programmable data processor connected to said transceiver, said memory and said print engine, said programmable data processor programmed to:

receive print data corresponding to pages to be printed from the communications channel via said transceiver;

convert said print data into page bit map data and control signals for supply to said print engine for printing a corresponding page, said conversion including executing a pattern fill operation of a plurality of tilings of a pattern into a clipping region of a page to be printed by dividing the pattern into a plurality of bands;

for each band:

rendering the current band of the pattern as a bit map into a band cache; and for each tiling of the pattern into the clipping region aligning a current tiling of the pattern to the page, clipping the bit map of the aligned current tiling of the current band of the pattern stored in the band cache to the clipping region, and until all tilings of all bands of the pattern are rendered to the page bit map.

10. The printer of claim 9, wherein:

said programmable data processor is programmed wherein said step of dividing the pattern into the plurality of bands divides the pattern into bands aligned with scan lines of the printed page.

11. The printer of claim 9, wherein:

said programmable data processor is programmed wherein said step of dividing the pattern into the plurality of bands divides the pattern into bands corresponding to individual scan lines of the printed page.

12. The printer of claim 9, wherein:

said programmable data processor is programmed wherein said step of dividing the pattern into the plurality of bands divides the pattern into a number of bands whereby each band may be stored within a predetermined amount of band cache memory.

13. A printer comprising:

a transceiver adapted for bidirectional communication with a communications channel;

a memory;

a print engine adapted for placing color dots on a printed page according to received page bit map data and control signals; and a programmable data processor connected to said transceiver, said memory and said print engine, said programmable data processor programmed to perform a pattern fill operation of a plurality of tilings of a pattern into a clipping region of a page to be printed by:

for each tiling of the pattern to the clipping region aligning the pattern to a current tiling of the pattern to the clipping region by generating a display list corresponding to each tiling to the pattern to the clipping region and storing the display list of each tiling of the pattern;

clipping the stored display list of the current tiling of the pattern to the clipping region; and rendering the clipped stored display list of current tiling of the pattern as bit map into a page bit map.

14. The printer claim 13, wherein:

said programmable data processor is programmed wherein said step of aligning the pattern data to the current tiling of the pattern to the clipping region includes iteratively stepping location parameters of the pattern data for each tiling.

15. The printer of claim 13, wherein:

said programmable data processor is programmed wherein said step of aligning the pattern data to the current tiling of the pattern to the clipping region includes for each tiling calling a subroutine which adjusts location parameters of the pattern data.

* * * * *